R. R. DUPLER.
WHEELED HARROW.
APPLICATION FILED MAR. 24, 1919.
1,327,424.
Patented Jan. 6, 1920.
2 SHEETS—SHEET 1.
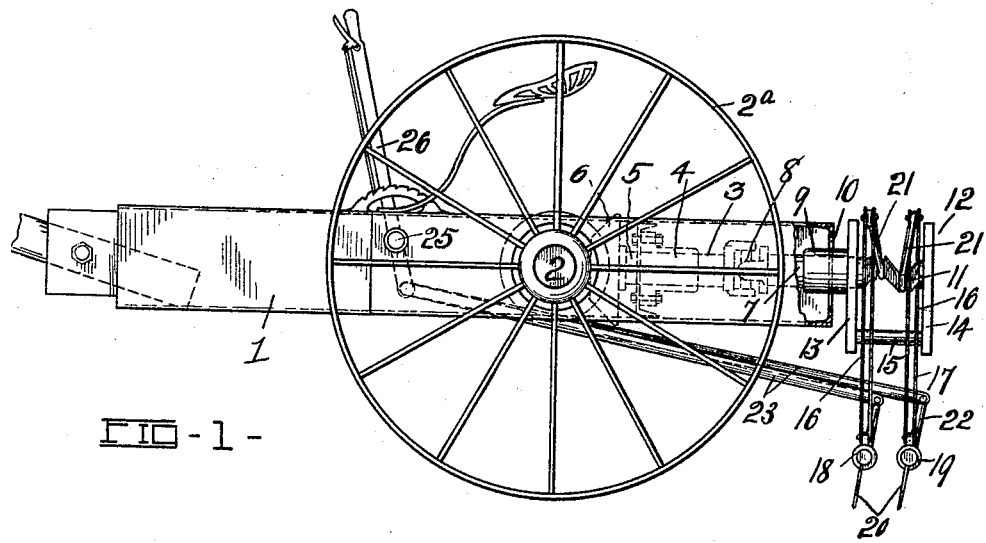
FIG-1-
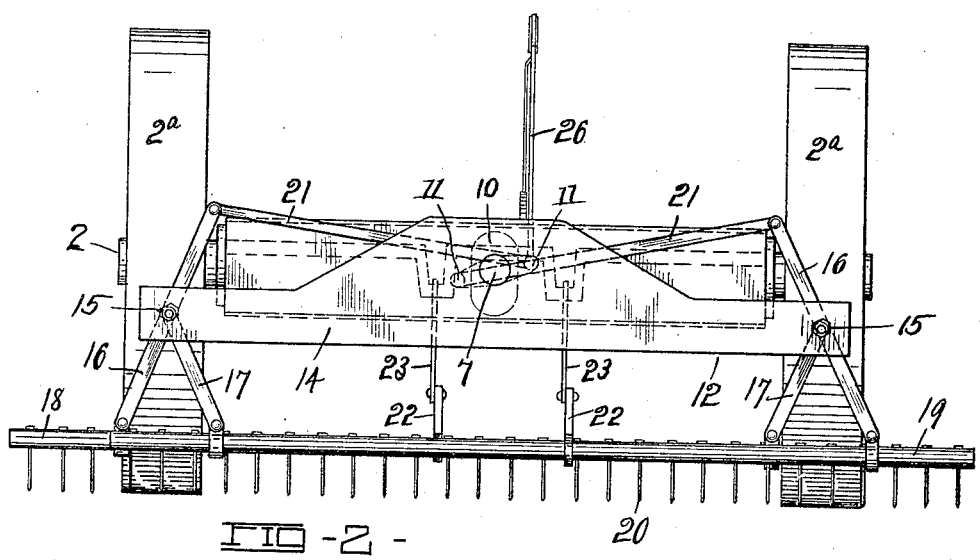
FIG-2-
INVENTOR
Raymond R. Dupler,
By Owen, Owen & Crampton,
His attys.

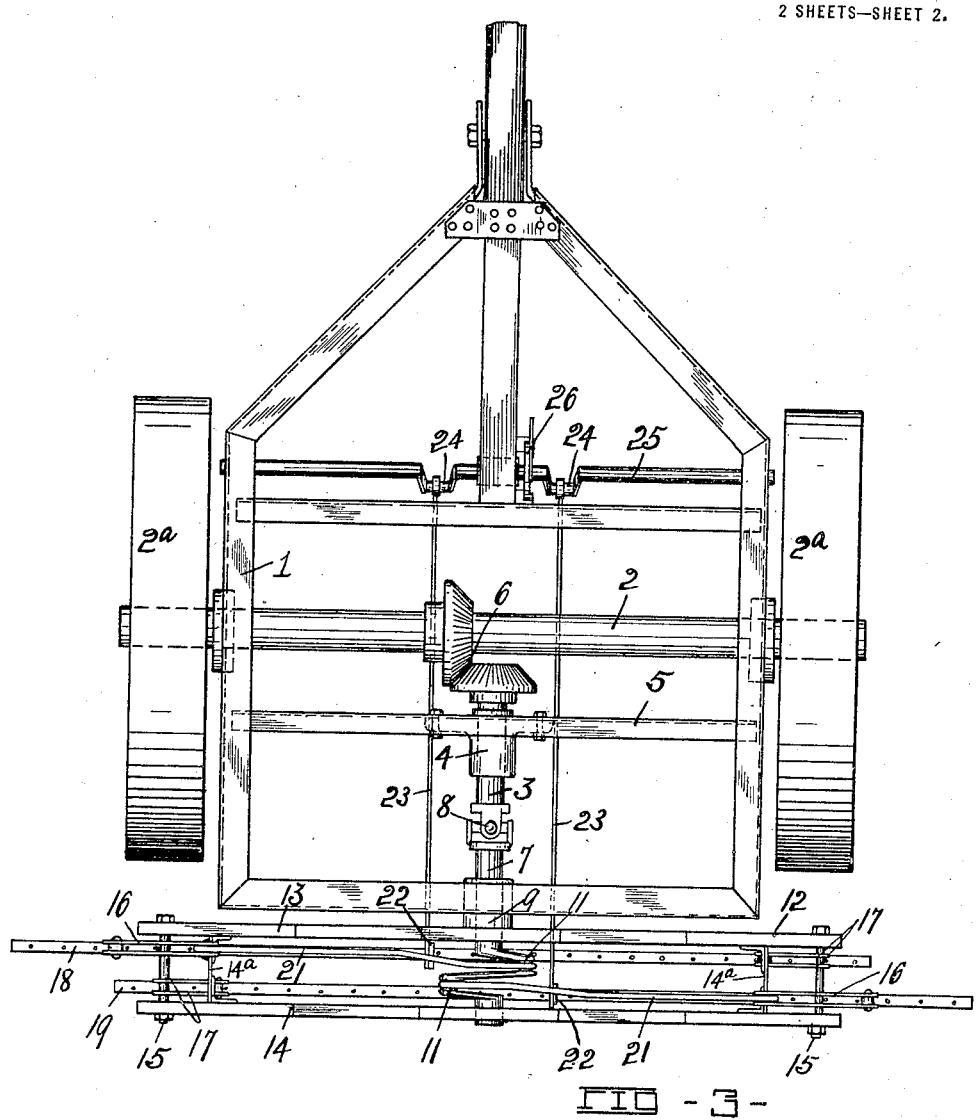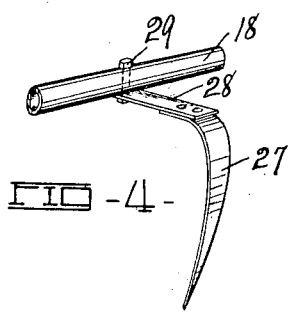

UNITED STATES PATENT OFFICE.

RAYMOND R. DUPLER, OF TOLEDO, OHIO.

WHEELED HARROW.

1,327,424.  Specification of Letters Patent.  Patented Jan. 6, 1920.

Application filed March 24, 1919. Serial No. 284,607.

*To all whom it may concern:*

Be it known that I, RAYMOND R. DUPLER, a citizen of the United States, and a resident of Toledo, in the county of Lucas and State of Ohio, have invented a certain new and useful Wheeled Harrow; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to agricultural implements and particularly to those employed for harrowing soil of a loose nature.

The object of my invention is the provision of a simple and improved apparatus of the class described having gangs of harrowing teeth which are caused, during an operation of the apparatus, to have relative reciprocatory movements transverse to the direction of travel of the machine, and which are also adjustable to vary the angle of the teeth relative to a horizontal plane.

A further object of the invention is to so mount the gangs of teeth that they are permitted to have rocking movements relative to the main frame of the apparatus to enable the gangs to adapt or adjust themselves to the level of the ground over which they are operating irrespective of any lateral tilting movements of the main frame.

A further object of the invention is the provision of spring teeth for a reciprocating harrow beam, which teeth have pivotal trailing action with respect to the beam, whereby an obstruction encountered by a tooth during a reciprocation of the beam transverse to the direction of travel of the machine will exert a stress against the front face of the tooth or in the direction of its yieldability rather than against a side edge thereof, thus lessening the liability of breakage of the teeth.

Further objects and advantages of the invention will be apparent from the following detailed description thereof.

While the invention, in its broader aspect, is capable of embodiment in numerous forms, a preferred embodiment thereof is illustrated in the accompanying drawings, in which,—

Figure 1 is a side elevation, Fig. 2 a rear elevation, and Fig. 3 a plan view of a machine embodying the invention, and Fig. 4 is an enlarged perspective view of a portion of one of the harrow teeth carrying beams with a spring tooth pivotally trailing therefrom.

Referring to the drawings, 1 designates the machine frame which may be of any suitable form and construction and which is mounted on a drive axle 2 carrying supporting wheels 2$^a$ at its outer ends, one or both of which wheels may be fixed to the axle to cause a driving thereof when the machine is drawn forward. A driving shaft 3 is journaled in a bearing 4 provided in a crossbeam 5 of the frame at the rear of the axle 2 and the axle 2 is in driving connection with the front end of this shaft through a set of bevel gears 6. The shaft 3 has an extension or section 7 in universal connection therewith, as at 8, and extending rearward through a bearing sleeve 9 which is mounted for vertical reciprocatory movements in a slot 10 provided in the rear end of the frame 1. The shaft section 7 is provided at the rear of the sleeve 9 with a plurality of cranks 11 (two in the present instance).

A tilting frame 12 is disposed at the rear of the main frame 1 transversely thereof and comprises the two beams or cross-members 13 and 14, which are rigidly spaced from each other longitudinally of the shaft section 7 by spacing members 14$^a$ and are connected at their ends by bolts or pivot pins 15. The front member 13 has the sleeve 9 fixed to and projecting forwardly therefrom centrally of its ends so that said member is journaled on the shaft and the rear member 14 is journaled centrally of its ends on the rear end of the shaft section 7 at the rear of its cranks 11. It is thus evident that the tilting frame is mounted on and carried by the shaft section 7 for vertical tilting movements relative thereto and for vertical movements with the shaft relative to the frame 1.

Each pivot pin 15 has a lever 16 fulcrumed thereto and a link 17 pivotally suspended therefrom and a harrow beam 18 is suspended at one end by the left hand lever 16 and at its other end by the right hand link 17. A second harrow beam 19 is disposed at the rear of the beam 18 being suspended at one end by the right hand lever 16 and at its other end by the left hand link 17. It is thus evident that the harrow beams 18—19 which may be provided with any desired number of harrow teeth 20, are suspended from the frame 12 in a manner to permit them to have longitudinal swinging movements transverse to the tilting axis of the frame 12 and relative to each other. Each lever 16 is connected to a different crank 11 of the shaft section 7 by a link 21 so that relative longitudinal reciprocatory movements are imparted to the harrow beams from a rotation of the shaft 7. In order to permit the beams 18 and 19 to have adjustment on longitudinal axes to vary the inclination of the harrow teeth, said beams are journaled in the lower ends of the respective levers 16 and links 17 and each has an arm 22 projecting upward therefrom and connected by a link 23 to a respective crank 24 on a control shaft 25. This shaft is journaled in the forward part of the frame 1 transversely thereof and has a lever 26 projecting therefrom within convenient reach of the operator.

If the harrow beams 18 and 19 be provided with spring teeth it is preferable to attach the teeth to arms which pivotally trail from the beams. This is illustrated in Fig. 4 in which 27 is a spring tooth, 28 an arm projecting forwardly from its upper end and 29 a bolt or pivot which pivotally connects the forward end of the arm to the harrow beam for horizontal pivotal movements. It is thus evident that when the beam is moved to the left, the tooth by reason of its trailing action will swing to the right toward the beam, and vice versa when the beam is moved in the opposite direction, thereby causing any obstruction to the movement of the tooth to exert a force against the face of the tooth instead of against its side as would be the case if the tooth were stationary with respect to the beam and moving therewith transversely of the path of movement of the machine. In this manner the breakage of the teeth is reduced to a minimum. It will of course, be apparent that if pivotal trailing teeth be employed, it will be necessary to impart a longer stroke of movement to the harrow beams in order to cause the teeth to move the same distance transversely of the machine as the fixed teeth.

In the use of my machine the harrow carrying frame 12 being mounted for ver- and out of the soil for each unevenness or obstruction, such, for instance, as stones or depressions encountered by the wheels of the machine.

I wish it understood that my invention is not limited to any specific construction, arrangement or form of the parts, as it is capable of numerous embodiments and changes without departing from the spirit of the claims.

Having thus described my invention, what I claim as new, and desire to secure by Letters Patent, is,—

1. In a harrow, a main frame, a tilting frame mounted for tilting movements relative to the main frame, a harrow beam suspended from said tilting frame for longitudinal reciprocatory movements relative thereto, and means for imparting reciprocatory movements to said beam when the machine is operated.

2. In a harrow, a main frame, supporting wheels therefor, a tilting frame mounted for tilting movements relative to the main frame, a harrow beam suspended from said tilting frame for longitudinal reciprocatory movements transverse to said wheeled frame, and means connecting one of said wheels and harrow beam for communicating reciprocatory movements to the beam from a rotation of said wheel.

3. In a harrow, a main frame, a crank shaft journaled in said frame longitudinally thereof, means for driving said shaft, a tilting frame carried by said shaft, a harrow beam suspended from said frame for tilting movements therewith and for longitudinal reciprocatory movements relative thereto transverse to said shaft, and means connecting said crank shaft and beam for imparting reciprocatory movements to the latter when the shaft is rotated.

4. In a harrow, a wheeled frame, a shaft journaled in said frame longitudinally thereof and having a crank section mounted for vertical reciprocatory movements relative to said frame, means for driving said shaft, a frame carried by the crank section of said shaft and mounted for tilting movements relative thereto, a harrow tooth carrying beam suspended from said tilting frame for tilting movements therewith and longiing movements relative thereto, harrow beams suspended from said tilting frame for longitudinal reciprocatory movements transverse to said shaft, and means connecting said crank section to each of said beams to impart reciprocatory movements to the latter when the crank section is rotated.

6. In a harrow, a wheeled frame, a crank shaft journaled longitudinally thereof, a tilting frame mounted for tilting movements relative to said frame transverse to said shaft, a harrow tooth beam below said tilting frame, means suspending said beam for longitudinal reciprocatory movements and for transverse rotary movements, means connecting the crank shaft and beam for imparting reciprocatory movements to the latter from a rotation of the shaft, and means connected to said beam and operable to transversely adjust it to vary the inclination of its teeth.

7. In a harrow, a frame, a crank shaft carried by said frame for vertical rocking and rotary movements, a tilting frame carried for tilting movements by the crank shaft transverse thereto, harrow means carried by the tilting frame for movements therewith and having reciprocatory movements imparted thereto relative to the tilting frame from a rotation of the crank shaft, and means for driving the crank shaft.

8. In a harrow, a main frame, a tilting frame mounted for tilting movements relative to the main frame, a harrow beam carried by the tilting frame for movements therewith and for longitudinal reciprocatory and rotary movements relative thereto, means for imparting reciprocatory movements to said beam, and means operable to impart rotary adjusting movements to the beam.

9. In a machine of the class described, a frame, a harrow beam mounted for longitudinal reciprocatory movements transversely of said frame, means for imparting such movements to the beam when the machine is operated, and harrow teeth pivotally trailing from said beam.

In testimony whereof I have hereunto signed my name to this specification.

RAYMOND R. DUPLER.